O. J. HARDGROVE.
Horse Hay-Fork.
No. 63,042.  Patented March 19, 1867.
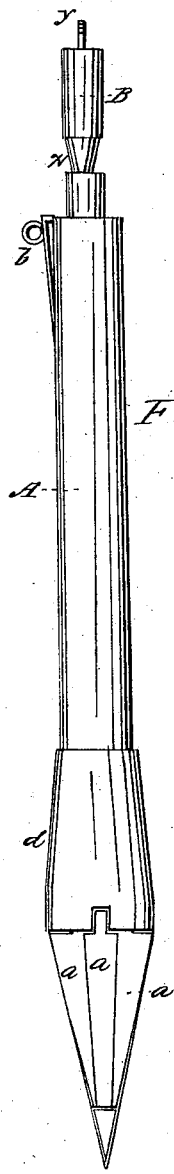
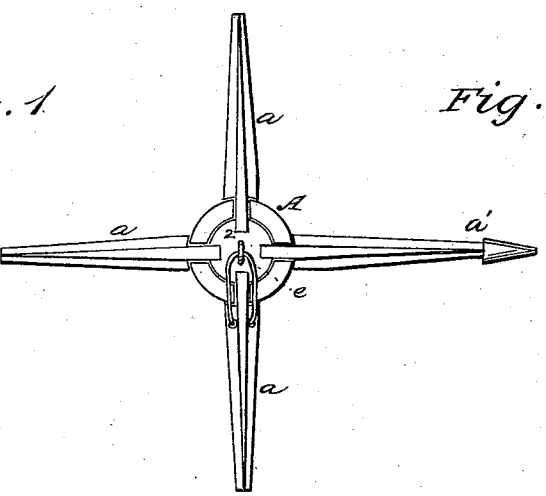
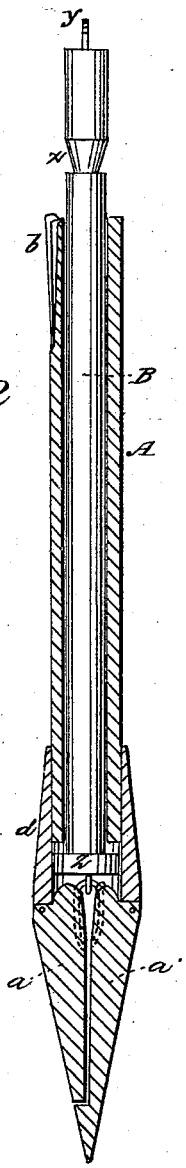
Witnesses:
John P Jacobs
Inventor:
O J Hardgrove

United States Patent Office.

O. J. HARDGROVE, OF CANTON, OHIO.

Letters Patent No. 63,042, dated March 19, 1867; antedated March 10, 1867.

---

IMPROVEMENT IN HORSE HAY-FORKS.

---

*The Schedule referred to in these Letters Patent and making part of the same.*

---

TO ALL WHOM IT MAY CONCERN:

Be it known that I, O. J. HARDGROVE, of Canton, Stark county, Ohio, have invented certain new and useful improvements in "Horse Hay-Forks;" and do hereby declare that the following is a full, clear, and exact description of the same, reference being had to the accompanying drawings, and the letters of reference marked thereon, making a part of this specification.

Figure 1 represents a side elevation.
Figure 2 represents a vertical section.
Figure 3 represents an inverted plan view, with the prongs spread out.

In the annexed drawings, A represents a hollow tube, which is made of suitable material, and within which is placed the shaft B. This shaft is made so as to extend slightly above the top of the tube A, and is provided with a disk, $z$, at the lower end; $d$ represents a thimble, which is secured to the end of the tube, and made somewhat larger than the same. To the extremity of the thimble are pivoted four prongs, $a\ a\ a$ and $a'$, which are pointed, as shown, and readily turn upon their pivots. The prong $a'$ is provided with a shoulder near its end, and made somewhat longer than the others, so that when the prongs are closed, as shown in fig. 1, they fold in behind the shoulder of prong $a'$, forming, as it were, one penetrater. One of the prongs $a$ is connected by a link, $c$, to the bottom of the disk $z$, as they all may be if deemed necessary. $b$ is a metal spring attached to the side of top of case A, and bent, as shown, to catch in a notch, $x$, in the shaft B, when said shaft is forced down. When shaft B is forced down, the disk $z$ strikes the inner ends of the prongs $a\ a\ a$ and $a'$, and forces them all outwards upon their pivots, and at right angles with the tube, (see fig. 3,) while the spring holds them by means of the notch $x$ in that position.

The operation of my device is as follows: The fork is suspended from a beam by the rope in the link $y$, when it is lowered into the hay in the position of fig. 1; then the shaft B is pressed, so that the disk separates the prongs in the position of fig. 3, holding the hay. The fork is then elevated and carried to the required position, when a cord attached to the spring $b$ is pulled, drawing the spring outwards, when the weight of the hay forces the prongs down, and the implement is ready for another operation.

Having thus fully described my invention, what I claim as new, and desire to secure by Letters Patent, is—

The case A, shaft B, thimble $d$, with prongs $a\ a$ and $a'$, and spring $b$, when constructed, arranged, and operating in the manner as and for the purposes specified.

As evidence that I claim the foregoing, I have hereunto set my hand in the presence of two witnesses.

O. J. HARDGROVE.

Witnesses:
 GEO. W. RAF
 ISAAC HAZLETT.